UNITED STATES PATENT OFFICE.

TALIAFERRO P. SHAFFNER, LOUISVILLE, KENTUCKY.

IMPROVEMENT IN EXPLOSIVE COMPOUNDS.

Specification forming part of Letters Patent No. 139,738, dated June 10, 1873; application filed May 28, 1873.

*To all whom it may concern:*

Be it known that I, TALIAFERRO P. SHAFFNER, of Louisville, Kentucky, have invented a new and Improved Explosive Compound, of which the following is a description:

The object of my invention is to enable those skilled in the arts to which it belongs, to make and use nitrated substances in forms and conditions that will more fully effect safety, economy, and success than has been hitherto realized.

What I mean by nitrated substances particularly includes gun-cotton, and all materials nitrated in the manner as in the manufacture of gun-cotton, embracing fiber matter, whether in pulp, thread, powdered, granulated, woven, pressed, or otherwise thus treated.

First, I take gun-cotton or nitrated substances, as above described, and soak it in water impregnated with saltpeter or nitrate of soda. When moist or wet, it can be exploded by immersing or fixing in the mass a strong percussion-cap, say, for example, containing about ten grains of fulminate of mercury. A less charge will answer. The cap to be ignited by blasting-fuse or other known means.

Second, I take gun-cotton or other nitrated fibrous substances, as described above, and saturate the same with paraffine, or bees-wax, or resin, or any oleaginous or resinous matter, either one or more of them. This compound or mixture can be exploded by a percussion-cap, in strength and manner as described under No. 1, above described.

Third, I take gun-cotton, or other nitrated fibrous substances, as described above, and mix with it or them nitrated matter, resin, sulphur, or analogous substances. These mixtures can easily be made by melting those that can be liquefied, and immersing the gun-cotton, &c., in the liquid. The mode of exploding this combination is the same as stated under No. 1, above described.

These compounds or mixtures are safe to transport and can be handled without danger of premature explosion; nor will they explode when loose by flame. The explosion of the gun-cotton will effect the immediate evolvement of the gases belonging to the other substances. I may use sugar or glutinous matter treated with nitre, instead of the gun-cotton.

What I claim, and desire to secure as my invention by Letters Patent, is—

The combination of gun-cotton or other nitrated fibrous substances, as described herein, with nitrated water, or liquids, or paraffine, or bees-wax, or its equivalent, substantially as herein described.

TAL. P. SHAFFNER.

Witnesses:
  H. M. HAIGH,
  E. W. GRIFFITH.